United States Patent [19]

Pagel et al.

[11] Patent Number: 4,783,627

[45] Date of Patent: Nov. 8, 1988

[54] APPARATUS FOR DETECTING THE ROTATIONAL POSITION OF THE CRANKSHAFT OF AN INTERNAL COMBUSTION ENGINE

[75] Inventors: Ernst-Olav Pagel, Boehmfeld; Wilhelm Bois, Gaimersheim; Peter Duba, Wettstetten, all of Fed. Rep. of Germany

[73] Assignee: Audi AG., Ingolstadt, Fed. Rep. of Germany

[21] Appl. No.: 6,998

[22] Filed: Jan. 27, 1987

[30] Foreign Application Priority Data

Jan. 25, 1986 [DE] Fed. Rep. of Germany ....... 3602292

[51] Int. Cl.[4] ........................... G01B 7/30; F02P 7/06

[52] U.S. Cl. .................................. 324/208; 123/414; 123/617

[58] Field of Search ............... 324/165, 173, 174, 208, 324/391; 123/612-617, 414

[56] References Cited

U.S. PATENT DOCUMENTS

| | | | |
|---|---|---|---|
| 3,944,923 | 3/1976 | Luteran | 324/165 |
| 4,089,316 | 5/1978 | Padgitt | 324/391 X |
| 4,142,152 | 2/1979 | Fincher | 324/165 |
| 4,280,165 | 7/1981 | Pospelov et al. | 324/173 X |
| 4,296,471 | 10/1981 | Goux | 324/391 X |
| 4,313,414 | 2/1982 | Planteline | 123/617 X |
| 4,369,405 | 1/1983 | Sato et al. | 324/174 |
| 4,370,614 | 1/1983 | Kawada et al. | 324/165 X |
| 4,442,822 | 4/1984 | Kondo et al. | 123/617 X |
| 4,519,362 | 5/1985 | Arakawa et al. | 123/612 X |

*Primary Examiner*—Gerard R. Strecker
*Attorney, Agent, or Firm*—Karl Hormann

[57] ABSTRACT

The invention proposes a rotor arrangement for use with an automotive Hall generator for detecting the precise position of a select or predetermined one of a plurality of pistons, or the precise rotational position of the crank shaft, of an Otto cycle engine, by providing a distinct marking on a trigger wheel preferably mounted for rotation with the drive shaft of a distributor for generating a signal in a Hall element which signal is then detected by evaluation or discriminating circuitry.

13 Claims, 4 Drawing Sheets

APPARATUS FOR DETECTING THE ROTATIONAL POSITION OF THE CRANKSHAFT OF AN INTERNAL COMBUSTION ENGINE

BACKGROUND OF THE INVENTION

1. Field of the Invention

The invention in general relates to means for monitoring the position of the piston in a predetermined combustion cylinder of an Otto cycle engine and, more particularly, it relates to a rotor or trigger wheel arrangement cooperating with a hall generator useful for detecting the precise position of a piston and, hence, the rotational angle or position of a crank shaft in an internal combustion engine.

2. Description of the State of the Art

Hall generators have found wide application in modern Otto cycle engines for the generation of signals relating to a predetermined position, for instance dead center, of the piston within a cylinder. The signals may be utilized for the control of ignition timing.

The signals may be generated by a trigger wheel provided in the distributor of an engine. Gaps or indentations may be provided in the wheel which may be monitored by a Hall element. Other signal generating markings, such as photocells, reed relays, magnets and the like, may, of course, also be used.

While such trigger elements are generally capable of detecting the position, such as dead center, of a piston within a combustion cylinder, they cannot generate selective cylinder signals i.e. signals representative of a predetermined cylinder. In order to generate such signals it would be necessary to feed to an associated logic control some kind of a signal representative of the initiation of the 720° operational cycle of a four-cycle engine.

OBJECTS AND SUMMARY OF THE INVENTION

It is, therefore, a general object of the invention to provide for an arrangement by means of which a reference cylinder of an internal combustion engine may be associated with a predetermined angular disposition of the crank shaft.

A more specific object of the invention resides in the provision of a trigger wheel arrangement in a Hall generator of an automotive ignition system by means of which the position of a piston relative to its 720° operational cycle may be precisely determined.

Another object of the invention resides in the provision of a trigger arrangement of the kind referred to which may be mounted into existing Hall generator ignition systems.

Yet another object of the invention is to provide a trigger wheel for use with a Hall element of an ignition system which operates reliably and which is inexpensive to manufacture.

The invention in a prefered embodiment thereof accordingly provides a rotor or trigger wheel arrangement for use with a Hall element for detecting the angular disposition of the crankshaft, or the elevational position of a piston in a predetermined combustion cylinder, of an Otto cycle engine which arrangement comprises a signal generator, including a trigger wheel, provided with a plurality of markings for generating a signal during a predetermined angle of rotation of the crank shaft and movable at a predetermined speed relative to the rotational speed of the crank shaft, the number of markings corresponding to the number of cylinders of the engine, one of the markings being distinct from the other markings, first and second sensors positioned at a predetermined distance from each other for detecting the markings, and circuit means operatively connected to the first and second sensors for detecting a signal representative of the distinct marking.

The invention accordingly comprises the apparatus possessing the construction, combination of elements, and arrangement of parts which are exemplified in the following disclosure, the scope of the application being indicated by the appended claims.

DESCRIPTION OF THE DRAWINGS

For a fuller understanding of the nature and objects of the invention reference may be had to the following detailed description taken in connection with the accompanying drawings in which.

DESCRIPTION OF THE PREFERED EMBODIMENT

Figure 1:
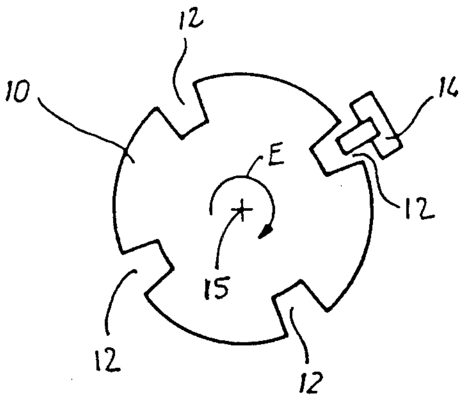
Fig.1 Prior Art
FIG. 1 is a planar view of a trigger wheel in accordance with the state of the art.
Figure 2:
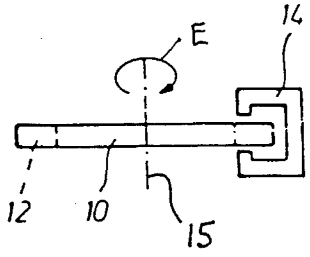
FIG. 2 is a side elevation of the trigger wheel of FIG. 1.

FIG. 1 shows a conventional trigger arrangement of the kind hitherto used in the art. It includes a rotor or trigger wheel 10 mounted for rotation at a speed related to the rotational speed of the crank shaft of an internal combustion engine (not shown). Advantageously, the trigger wheel 10 may be mounted for rotation, as indicated by the arrow E, on the drive spindle, schematically indicated at 15, of the rotor of an automotive ignition distributor (not shown). The trigger wheel 10 may be provided with markings 12, here shown as indentations, spaced at equal intervals around the periphery of the wheel 10. The number of the markings preferably corresponds to, or is a multiple of, the number of combustion cylinders of the internal combustion engine (not shown) associated with the arrangement. A sensor 14, schematically depicted as a Hall generator, is positioned such that its flux path intercepts a marginal portion of the trigger wheel 10 and, hence, the markings 12 for monitoring the latter during rotation of the wheel 10, and for generating a signal for each marking passing through the flux field.

Since the markings of the prior art trigger wheel 10 are identical they cannot unambiguously identify the cylinder associated with any one of the markings.

For the sake of clarity none of the means required for mounting and driving the trigger wheel 10 have been shown in the drawings, except schematically, as such means are deemed to be well known to persons skilled in the art. To the extent the trigger wheel in accordance with the present invention uses elements similar to those of the wheel 10 in accordance with the prior art they will be identified by similar but primed reference numerals.

Figure 3:
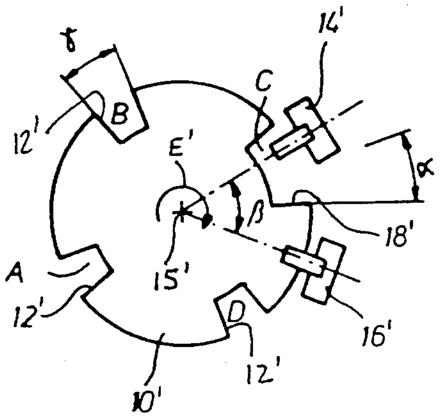
FIG. 3 is a planar view of a trigger wheel in accordance with the invention.

FIG. 3 depicts an arrangement in accordance with the invention in which one of the markings is distinct from the other markings for providing a reference signal to identify a predetermined cylinder.

The trigger wheel 10' depicted in FIG. 3 is provided in its periphery with a plurality of markings 12' and 18. The markings 12' are identified by indentations A, B and D.

Advantageously, the trigger wheel 10' may be mounted for rotation, as indicated by the arrow E', on the drive shaft, depicted schematically at 15', of an automotive distributor (not shown), but should in any event be rotatable at a predetermined ratio relative to the rotation of the crank shaft of an engine. A sensor or signal generator 14' may be positioned sufficiently close to the periphery of the wheel 10' to generate signals on the basis of the markings monitored during rotation of the wheel 10'. Each of the indentations A, B, and D has an angular width $\gamma$. When passing through the flux field of the signal generator 14' each indentation A, B and D will generate a signal or pulse the duration of which is proportional to the rotational speed of the wheel 10' and to the size of the angle $\gamma$.

The marking 18, constituting a further indentation C, is shown to be physically distinct from the indentations A, B and D in that it exceeds the angular width $\gamma$ of the latter by an angle $\alpha$. Owing to its physical distinctiveness the indentation C may generate a signal different from the signals generated by indentations A, B and D. This different signal may be associated with a predetermined reference cylinder of the engine and may be identified, in manners to be described, by evaluation or discriminator circuits.

As will be appreciated by those skilled in the art, the total number of markings A, B, C and D may either equal, or be a multiple of, the number of combustion cylinders of an engine (not shown) with which the arrangement is to be associated. Also , it will be understood that while the principles of the invention, by way of a preferred embodiment, are described in connection with markings in the form of gaps or indentations in peripheral portions of a trigger wheel, other readable markings such as, for instance, photocells and light sources, reed switches, magnetic switches, etc. may also be used.

Also, while the markings are herein shown and described in connection with a rotatably mounted trigger wheel other arrangements for moving the markings at a speed related to the rotational speed of a crank shaft may be provided.

In addition to the sensor 14', a second sensor 16 may be mounted adjacent the periphery of the trigger wheel 10'. The sensor 16 is displaced from the sensor 14' by an angle $\beta$. In a preferred embodiment, the sensors 14' and 16 may be structurally identical Hall generators having their flux paths intercepted by the peripheral margin of the trigger wheel 10'.

As shown in FIG. 3 the markings 12' and 18 are preferably constituted by indentations. The trigger wheel 10' may be a metallic wheel or disk. The sensors 14' and 16 preferably are Hall elements, but depending upon the nature of the markings other sensors may be used. Alternatively, light sources and photocells, magnets and reed switches, or other paired control elements readable by monitoring circuits well know in the art may be used.

Each of the markings 12' and 18 may cause the sensors 14' and 16 to release signals or pulses $S_1$ and $S_2$, respectively. The pulses $S_1$ and $S_2$ are fed to an evaluation or discriminator circuit for generating a reference signal each time the marking 18 passes through the flux fields of the sensors.

Evaluation or discriminator circuits which may be associated with the trigger wheel 10' or other signal generating arrangements in accordance with the invention, as well as the signals or pulse trains present in such circuits, will now be described with reference to FIG. 3 seq. The pulse trains may constitute parameters determining the sizes of the angles $\alpha$, $\beta$, and $\gamma$.

In the following description of various examples of evaluation or discriminator circuitry useful in the practice of the invention it will be assumed that they will be associated or cooperating with the timing wheel 10' of FIG. 3. Hence the reference numerals of the latter will be used in connection with the description of all the circuits. To the extent the latter use similar elements they will be identified by identical reference numerals with appropriate primes.

Figure 4:
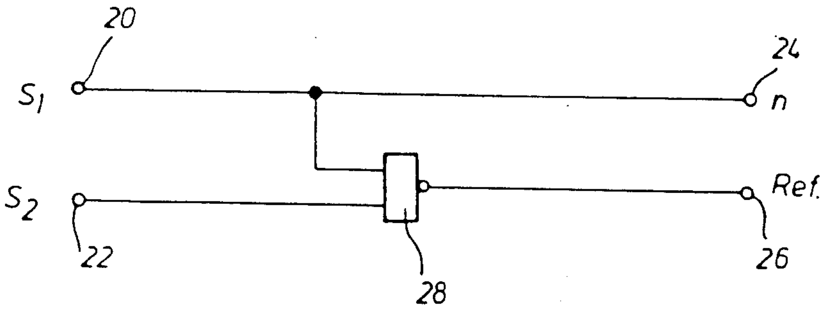
FIG. 4 is a schematic presentation of a signal evaluation circuit for use with the invention.

An evaluation or discriminator circuit of simple construction useful in connecting with the signal generator arrangement described is depicted in the diagram of FIG. 4. The signal $S_1$ generated by the sensor 14' may be applied to the circuit at an input terminal 20; and the signal $S_2$ coming from the sensor 16 may be applied to an input terminal 22. The signal $S_1$ is also present at an output terminal 24 where, in a manner well known in the art and thus not described here, it may be used for measuring engine rotations, for instance, to derive minimum engine operating parameters therefrom. Since the signal $S_1$ does not pass through any active circuit components between input 20 and output 24 it would not be affected by breakdowns in the circuit.

The evaluation or discriminator circuit comprises an NAND-gate 28 the inputs of which are connected to circuit input terminals 20 and 22. With both pulses $S_1$ and $S_2$ present at the respective inputs of the NAND-gate 28, the latter may pass a reference signal to an output terminal 26.

For the understanding of the circuits herein disclosed it is to be noted that the circuits employ negative logic, that it to say, "low" input signals will generate high output signals.

Figure 5:
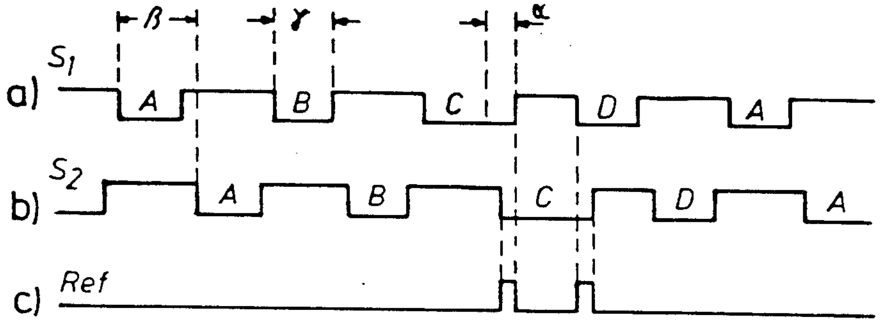
FIG. 5 is a diagram of the signals generated in the circuit of FIG. 4.

The pulses depicted in FIG. 5 are based on the assumption that the trigger wheel 10' has an indentation the angular width $\alpha$ of which corresponds to a crank shaft rotation of 30° and the angle $\beta$ of which correspondes to a rotational angle of the crank shaft of 45°.

The pulses $S_1$ shown at (a) in FIG. 5 are applied to one of the inputs of the NAND-gate 28. The pulses $S_2$ shown at (b) in FIG. 5 are applied to the other input of the NAND-gate 28. The pulses $S_1$ and $S_2$ are identical but they are out of phase by the angle $\beta$. The relative dimensions of the angles $\alpha$, $\beta$, and $\gamma$ are such that only when the wider marking 18 passes through the flux fields of the sensors 14' and 16 do both sensors 14' and 16 generate a signal simultaneously. This leads to a pulse at the output of the NAND-gate 28 which after inversion is available at the output terminal 26 as the reference signal depicted at (c) in FIG. 5.

Figure 6:
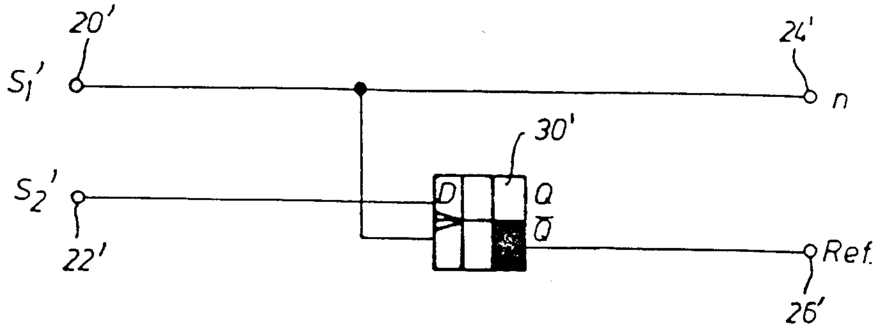
FIG. 6 is a diagram of another evaluation circuit.

A further embodiment of an evaluation or discriminator circuit is shown in FIG. 6. It may be used for converting a reference signal or double pulse of the kind depicted at (c) in FIG. 5 into a clearly identifiable reference pulse.

In the circuit of FIG. 6, pulses $S_1'$ generated by the sensor 14' are fed to the input terminal 20' of the circuit, and pulses $S_2'$ from the sensor 16 are fed to the input terminal 22'. In a manner similar to the circuit arrangement of FIG. 4 the pulses $S_1'$ are simultaneously present at the output terminal 24' as a signal representative of the rotational speed of an engine (not shown).

Figure 7:
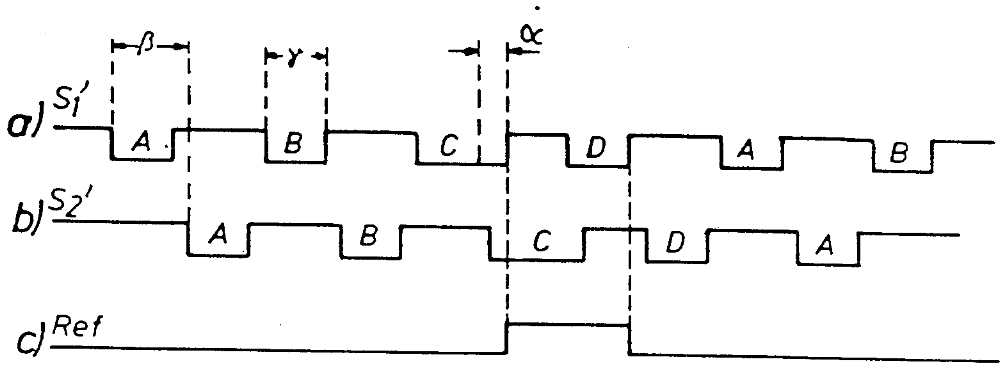
FIG. 7 is a diagram of the signals generated in the circuit of FIG. 6.

As shown by curve (a) of FIG. 7 the pulses $S_1'$ are simultaneously applied to the trigger-input of a flip-flop 30 which is triggered each time the trailing edge of a marking 12' or 18 passes through the flux field of the sensor 14' and so that the Q output switches to "high" only if at the instant of the positive triggering edge the prior condition of the D-input was "low", see curve (b). Hence, a pulse train is generated at the output of the flip-flop 30 which assumes a "high" condition only once during each rotation of the trigger wheel 10'. This "high" occurs precisely when the trailing edge of the indentation C' passes the sensor 14', see curve (c).

The pulses $S_1'$ present at the output terminal 24' come from the sensor 14' directly and are of different widths proportional to the widths of the indentations 12' and 18', respectively. Therefore, they account for, or cause, an uneven keying ratio.

Figure 8:
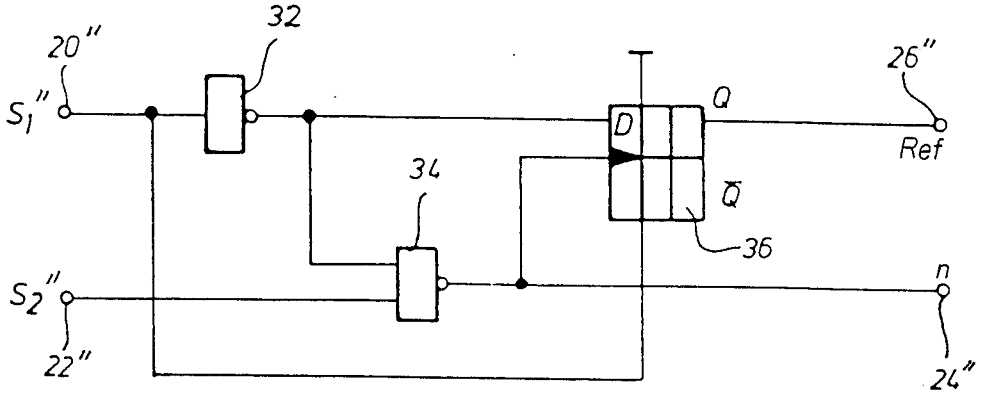
FIG. 8 is a schematic presentation of a third embodiment of an evaluation circuit.

FIG. 8 depicts a further discriminator circuit which may provide for an even keying ratio where the angle $\beta$ between the sensors 14' and 16 corresponds to the angular widths $\gamma$ of the markings A, B and D.

The circuit of FIG. 8 is provided with input terminals 20" and 22" which respectively receive pulses $S_1''$ and $S_2''$ from the sensors 14' and 16. A reference signal may be present at an output terminal 26", and a signal representing engine rotations may be present at an output terminal 24".

The circuit is provided with a flip-flop 36 to the reset terminal of which pulses $S_1''$ may be applied directly from input terminal 20". Inverted pulses $S_1''$ may be applied, by way of an inverter 32, to the D input of the flip-flop 36 and to one input of a NAND-gate 34. The other input of the NAND-gate 34 is connected to the input terminal 22" to receive pulses $S_2''$ therefrom. The output of the NAND-gate 34 is connected to the clock input of the flip-flop 36. The output of the NAND-gate 34 is also present at the output terminal 24" of the circuit as an indication of the rotational speed of an engine (not shown).

Figure 9:
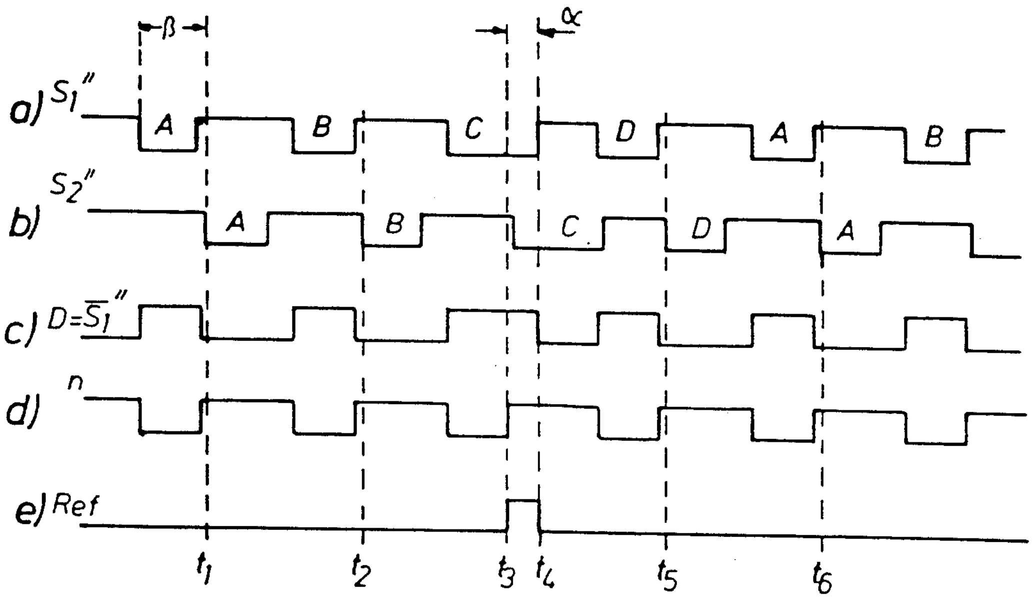
FIG. 9 is a diagram of the signals generated in the circuit of FIG. 8.

The circuit of FIG. 8 functions as follows: Pulses $S_1''$ from the sensor 14' are shown at (a) in FIG. 9; (b) in FIG. 9 represents pulses $S_2''$ from sensor 16; and (c) in FIG. 9 depicts the inverted pulses $S_1''$ present at the D input terminal of the flip-flop 36. With the pulses as shown at (b) and (c) of FIG. 9 being present at the respective inputs of the NAND-gate 34, pulses (d) of FIG. 9 will be present at the output of the NAND-gate 34. The pulses as shown at (d) in FIG. 9, having a constant keying ratio, may be utilized as an indication of rotational speed.

At times $t_1$, $t_2$, $t_5$ and $t_6$ the inverted signal $S_1''$ is "low". Thus, when a signal is applied to its clock input the flip-flop 36 cannot be set by the inverted $S_1''$ signal.

Owing to the wider gap C (by angle $\alpha$) the signal $S_1''$ is "high" at time $t_3$. Thus, the flip-flop 36 is set and passes a reference signal from its Q output to the output terminal 26" of the circuit. At time $t_4$ the positive edge of $S_1''$ is applied to the reset input of the flip-flop 36 which is thereby reset.

The invention herein described provides for a simple and effective apparatus for monitoring the precise position of the piston within a predetermined cylinder of an Otto cycle combustion engine by monitoring the position of markings readable by sensing means and associated with the pistons. The markings are preferably provided on a trigger wheel rotating at a predetermined ratio relative to the rotation of the crank shaft or movement of the pistons. One of the markings is distinct from the other markings and is associated with a predetermined one of the pistons. Evaluation or discriminator circuitry is provided for detecting a signal representative of the distinct marking.

While the invention has been described as applied to an Otto cycle engine, it will be apparent to those skilled in the art that it could be applied with equal advantage to engines of the kind operating with spontaneous combustion, such as Diesel engines. In such an application the rotor or trigger wheel could, for instance, be connected directly to the crank shaft of the engine.

Since certain changes may be made in and to the above apparatus without departing from the scope, principles or spirit of the invention described, it is intended that all matter contained in the above description or shown in the accompanying drawings be interpreted as illustrative only and not in a limiting sense.

What is claimed is:

1. Apparatus for detecting the rotational position of the crank shaft in an internal combustion engine having a plurality of cylinders, comprising:

trigger wheel means mounted for rotation at a speed proportional to the rotation of said crank shaft;

a plurality of marker means and an additional reference means respectively associated with one of said cylinders and provided on said trigger wheel means at predetermined spacings from each other for movement therewith, each of said marker means being of a first length and said reference means being of a second length greater than said first length, said first and second lengths relating to predetermined angular displacements of said crank shaft;

first sensing means responsive to said marker means and said reference means during movement of said trigger means for providing first marker means signals and first reference means signals;

second sensing means positioned from said first sensing means by a distance less than said predetermined spacings and less than said second length and responsive to said marker means and said reference means during movement of said trigger wheel means for providing second marker means signals and second reference means signals identical to but out of phase with said first marker means signals and reference means signals; and signal processing means comprising first and second input terminals connected to said first and second sensing means, respectively, a first output terminal for passing said first marker means signal from said first sensing means, means for combining said first and second reference means signals, and a second output terminal for passing said combined reference means signal from said combining means.

2. The apparatus of claim 1, wherein said means for combining comprises means responsive to said first and second sensing means providing said first and second reference means signals simultaneously.

3. The apparatus of claim 2, wherein said rotatable means rotates at half the speed of said crank shaft.

4. The apparatus of claim 2, wherein said first and second sensing means provides said first and second reference signal simultaneously once during each rotation of said trigger wheel means.

5. The apparatus of claim 4, wherein said signal processing means comprises switch means having first and second input means respectively connected to said first and second sensing means.

6. The apparatus of claim 5, wherein said switch means comprises gate means.

7. The apparatus of claim 6, wherein said gate means comprises a NAND-gate.

8. The apparatus of claim 6, wherein said switch means comprises a flip-flop.

9. The apparatus of claim 7, wherein said NAND-gate comprises input terminals connected to said first and second sensing means and an output terminal for passing the reference means signal.

10. The apparatus of claim 1, wherein said second output terminal passes said reference means signal upon the presence at the first input terminal of a signal from the first sensing means and upon the presence at the second input terminal of a signal having a predetermined logical value.

11. The apparatus of claim 10, wherein the signal processing means comprises a flip-flop.

12. The apparatus of claim 1, wherein said second output terminal passes said reference means signal upon receipt at the first input terminal of a signal having a predetermined logical value and upon receipt at said second input terminal of the trailing edge of the signal from said second sensing means.

13. The apparatus of claim 12, wherein said signal processing means comprises a NAND-gate the input terminals of which are connected to said first sensing means by way of an inverter and to said second sensing means, and the output terminal of which is connected to one input terminal of a flip-flop the other input terminal of which is connected to the first sensing means by way of said inverter and the output terminal of which passes the reference means signal.

* * * * *